Jan. 27, 1970  L. V. PFAENDER  3,492,105
PROCESS OF MAKING LUMINESCENT GLASS FILMS
Filed March 26, 1965  3 Sheets-Sheet 1
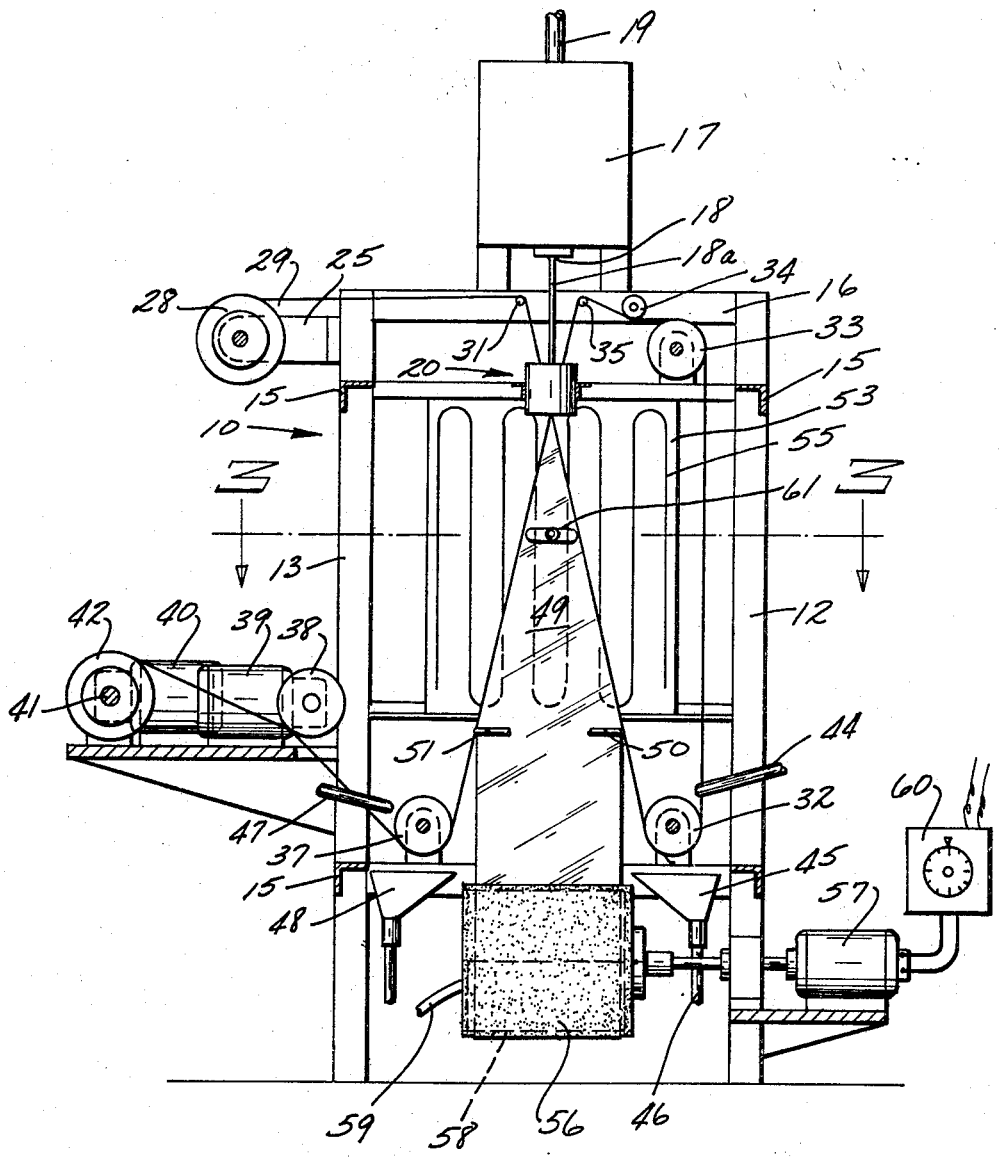
INVENTOR.
LAWRENCE V. PFAENDER
BY
ATTORNEYS

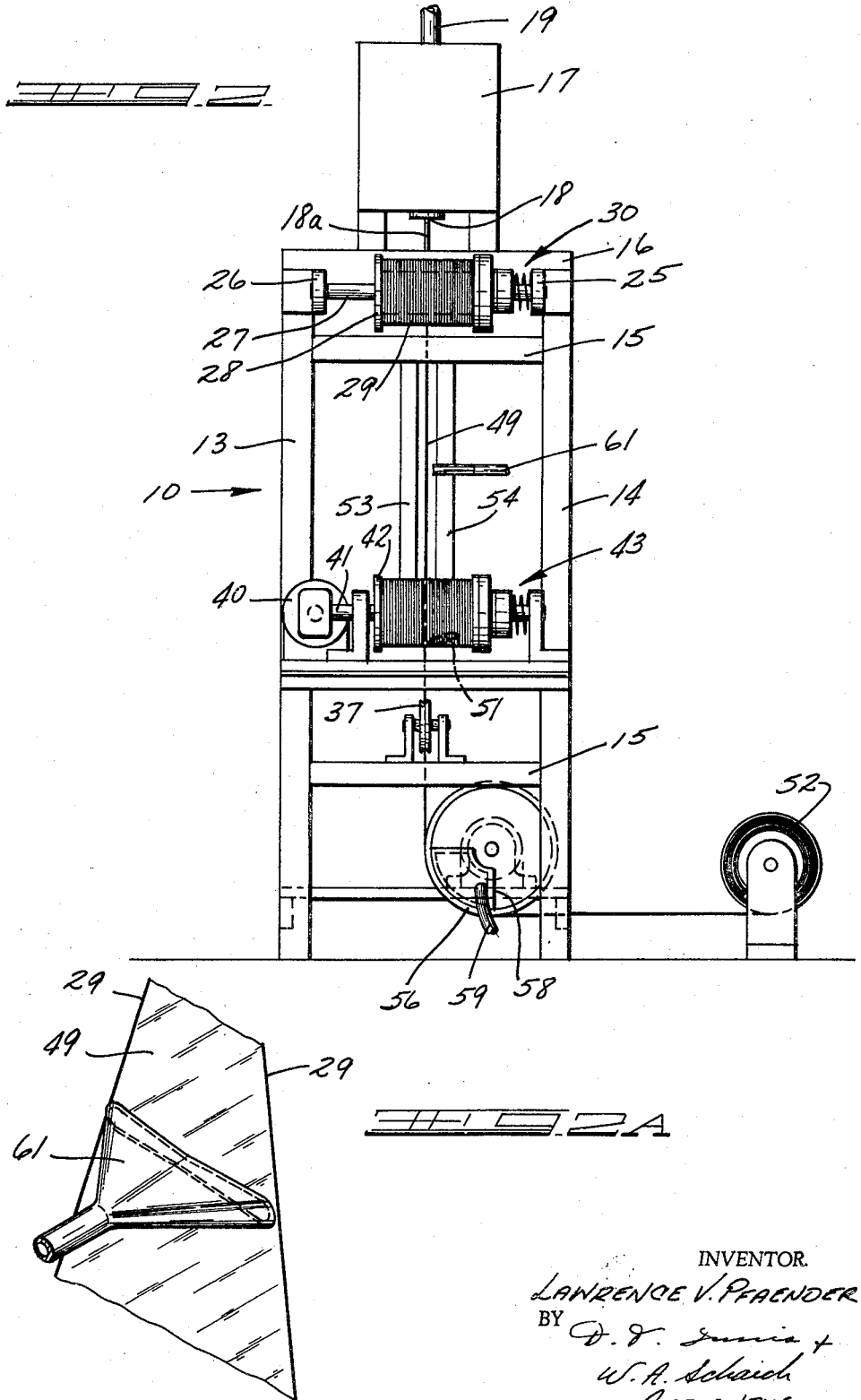

Jan. 27, 1970     L. V. PFAENDER     3,492,105
PROCESS OF MAKING LUMINESCENT GLASS FILMS
Filed March 26, 1965     3 Sheets-Sheet 3
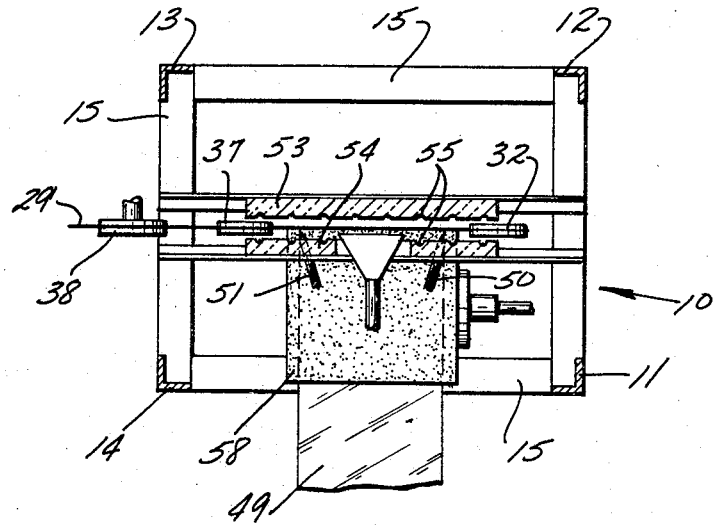
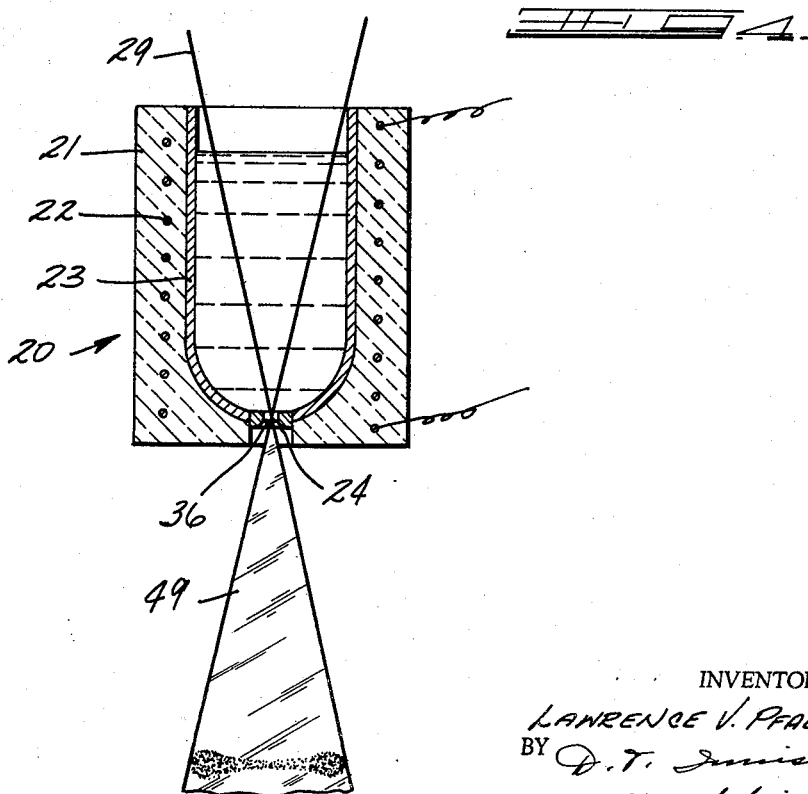
INVENTOR.
LAWRENCE V. PFAENDER
BY
ATTORNEYS United States Patent Office 3,492,105
Patented Jan. 27, 1970

3,492,105
PROCESS OF MAKING LUMINESCENT
GLASS FILMS
Lawrence V. Pfaender, Toledo, Ohio, assignor to
Owens-Illinois Inc., a corporation of Ohio
Filed Mar. 26, 1965, Ser. No. 443,014
Int. Cl. C03c 17/00
U.S. Cl. 65—60                                              6 Claims

ABSTRACT OF THE DISCLOSURE

A method is provided for embedding phosphor particles in a glass film without subjecting the phosphors to excessive heat that would seriously affect these particles. As the glass film is being stretched between diverging wires the phosphor particles are sprayed onto the surface of the glass film and become embedded therein. The glass film is then removed from the wires when it has achieved a uniform thickness in the range of 0.3 to 5 mils.

---

The present invention relates to a method for producing luminescent glass products and, more particularly, to a method for producing extremely thin sheet glass or foil of uniform thickness exhibiting luminescence when subjected to activation radiation, and products produced thereby.

Heretofore, serious difficulties have been encountered in the process of incorporating phosphors into a glass matrix because the phosphors cannot readily withstand the high temperatures of the molten or softened glass and are deleteriously affected or even destroyed by the excessive heat even in relatively short times. As a result, glass products containing phosphors show a substantial loss in light output efficiency.

Accordingly, it is the object of the present invention to provide glass films or sheets that will luminesce under proper activation radiation while avoiding the shortcomings and disadvantages of prior known methods and compositions.

It is a further object of the present invention to provide a method for making glass films or sheets that will luminesce under proper activation radiation without deleteriously affecting the luminescence producing substance.

It is a further object of the present invention to provide a method for producing extremely thin sheet glass or foil that will luminesce under proper activation radiation.

It is a further object of the present invention to provide extremely thin sheet glass or foil having a luminescence producing substance attached thereto.

It is a further object of the present invention to provide extremely thin glass films having phosphors embedded therein which will luminesce under proper activation radiation.

In attaining the above objects, one feature of the present invention resides in forming an extremely thin glass sheet or foil and applying thereto finely divided luminescence producing material under conditions whereby the luminescence producing material is not adversely affected by the heat of the glass.

A further feature of the present invention resides in applying the phosphor particles in finely divided form to an extremely thin glass film while the film is being drawn and while the film is at an elevated temperature, the thickness of the film being such that the heat transmitted to the particle is negligible.

These and other objects, features and advantages of the present invention will become apparent to those skilled in the art from the following detailed description thereof.

According to the present invention, there is provided a method for encapsulating or embedding luminescence-producing substances, such as phosphors, in glass matrix without subjecting the luminescence-producing substances to excessive heat as would seriously affect the said substance. Products produced by the present invention exhibit high light output efficiency and because the phosphors are embedded in the glass, good protection is afforded against erosion, moisture and the like.

The aforementioned advantages are obtained by applying the phosphor particles to an extremely thin glass sheet or foil while the latter is at an elevated temperature and during the drawing and stretching of the glass film. Any suitable glass film drawing technique can be used. As the glass film is being stretched and drawn the phosphor particles are sprayed thereon in a fine spray, fog or mist so as to become readily embedded in the surface of the glass film. The thickness of the glass film being drawn is such that the heat content of the film is dissipated in the immediate area surrounding the phosphor particles upon the latter striking the glass film. Therefore, heat build up of the phosphor particle with resulting adverse effects is avoided.

Several methods exist for producing thin glass films, however, the preferred method is the so-called stretch-wire technique described in my copending application Ser. No. 132,098 filed Aug. 17, 1961, entitled "Forming Thin Glass Foil" and now U.S. Patent No. 3,186,813 issued June 1, 1965. Other methods for drawing thin glass films may, however, also be utilized for the purposes of the present invention.

The invention will be further illustrated and explained by the attached sheets of drawings wherein:

FIG. 1 is a schematic front elevational view of the film forming apparatus suitable for practice of the invention and showing means for application of the luminescence-producing substance.

FIG. 2 is a left-side elevation of the appaartus of FIG. 1.

FIG. 2A is a schematic perspective view on an enlarged scale illustrating the phosphor spraying device.

FIG. 3 is a cross-sectional view taken at line 3—3 on FIG. 1.

FIG. 4 is an enlarged detailed view of the chamber or pot from which the molten glass is being drawn.

Referring now to FIGS. 1 to 3, apparatus suitable for practice of the present invention comprises a base 10 in the form of four upright members 11, 12, 13 and 14 joined together near the bottom and top thereof by a plurality of horizontal members 15. The top of the members 11 to 14 are also joined together by a horizontal platform 16. The platform 16 serves as the supporting member for a glass melting chamber 17. The chamber 17 is provided with an orifice 18 in the bottom thereof which may be opened and closed by a vertically shiftable valve body 19 in the form of a plunger which is adapted to cooperate with the inner surface of the orifice 18 to block or control the rate of glass flow out of the orifice. Vertically below the orifice 18 is positioned a chamber or pot 20. The melting chamber 17 is provided with suitable heating means, not shown, so as to provide a supply of molten glass for the pot 20.

As the glass issues in a continuous stream 18a from the orifice 18, it will fall through the open top of the chamber or pot 20, the details of which are shown in FIG. 4. The pot 20 is formed of a heat-resistant ceramic material 21 with heating coils 22 embedded therein in surrounding relationship with respect to a platinum liner 23 which forms the internal surface of the pot 20.

An orifice member 24 is formed in the bottom of the ceramic pot 20 and is in communication with the interior of the chamber formed by the platinum liner. The orifice 24 has a relatively small opening therethrough which controls the amount of glass which will issue there-from and be formed into a sheet or foil. The primary function of the heating coils 22 is to maintain the glass contained within the pot 20 at a constant uniform temperature during the operation of the glass forming device.

Furthermore, by having the heating coils embedded in the ceramic 21 of pot 20 and having the pot 20 separate from the melting chamber 17, easy access is provided for rethreading the wires through the orifice member 24 in the event of breakdown.

A pair of spaced horizontally extending bearing supports 25 and 26 are connected to the base 10 adjacent the top thereof and serve as the support for a horizontal shaft 27. The shaft 27 supports a spool 28 having a plurality of turns of wire 29 wrapped thereon. Rotation of the spool 28 with respect to the shaft 27 is resisted by a spring clutch mechanism 30. The wire 29 extends from the spool 28 and is guided by a roller 31 positioned above the pot 20 and laterally displaced from the axis therefor. Wire 29 then extends down through the pot and out through the orifice 24 formed in the bottom thereof and passes beneath a pulley 32 which is mounted for rotation about a horizontal axis adjacent to the bottom of the base 10. The wire 29 extends from beneath the pulley 32 in a vertical direction and passes over a second pulley 33 which is mounted adjacent the top of the base 10.

After passing over pulley 33, the wire 29 will pass under a pulley 34 and over a second roller 35 which is positioned above the pot 20 and displaced from the vertical axis of the pot an amount substantially equal to the displacement of the first roller 31 but on the diametrically opposed side of said pot axis. The wire 29 continues downwardly through the pot 20 out through the orifice 24 and passes itself at a point 36, which initially is above the bottom of the orifice 24, then continues downward to a third pulley 37 which is mounted for rotation with respect to the base 10 in substantially the same horizontal plane as the previously mentioned first pulley. After passing under the pulley 37, the wire 29 makes one complete turn around a fourth pulley 38. This fourth pulley 38 is driven by a variable speed motor 39. The motor 39 serves as the means for drawing the wire from the supply spool 28 and through the pot 20 twice. A second motor 40 is adapted to rotate shaft 41 which is coupled to a take-up spool 42 by means of a second spring clutch 43. Thus, the motor 40 maintains the wire 29 tightly looped about the pulley 38 so that rotation of the pulley 38 will draw the wire 29 through the apparatus at a controlled speed. Additionally, the wire 29 is maintained under predetermined tension by the first mentioned spring clutch 30 which is resisting the rotation of the supply spool 28.

Inasmuch as the wire 29 will be heated during its first passage through the pot 20, it is necessary that the wire be cooled before its second passage therethrough. Also, it is necessary to remove any glass which will be adhering to the wire prior to its second trip through the pot 20. To accomplish these purposes, applicant provides a supply of water through a nozzle 44 which is directed to impinge on the pulley 32. Below the pulley 32 is a funnel 45 which will collect the water from the pulley 32. The funnel 45 has a drain pipe 46 connected thereto for carrying the water off to a suitable drain. In this manner applicant cools the wire 29 and any glass adhering thereto will be solidified.

After the wire 29 passes over the second pulley 33, its linear direction is changed by the pulley 34. This change of direction causes the solidified glass thereon to be cracked from the wire, thus when the wire passes over the second roller 35, it is free of any adhering glass.

After the wire has passed through the pot 20 for the second time, it is cooled in substantially the same manner as previously described with respect to the cooling effected at pulley 32, by a flow of water from a nozzle 47 impinging on the pulley 37. A discharge funnel 48 is positioned below the pulley 37 and will carry the water away from the machine to a suitable drain. As the wire 29 is drawn through the pot 20, the molten glass contained therein will adhere to the wire 29 and in view of the surface tension of the glass and the fact that the two portions of the wire are continuously moving in divergent directions, a glass film 49 will be formed between the diverging portions of the wire 29. The area between the portions of wire below the pot 20 is defined as the spreading zone.

It has been observed that as the wires first leave the pot 20 in their downward direction, they have a considerable amount of molten glass thereon but by the time they have traversed the height of the spreading zone, there is considerably less glass still retained on the wire. It thus appears that the wire acts as continuously moving reservoirs for the molten glass that forms the film or foil 49. The glass film 49 is removed from the wire by a pair of torches 50 and 51 which direct small flames against the film or foil adjacent the wires thus severing the film from the wire. Although it has been shown that the film may be severed from the wire by the use of torches, other means, for example, electric arc cutting or mechanical shearing could likewise be employed.

Prior to the point in the operation where the glass film 49 is separated or severed from wire 29, the surface thereof is sprayed with the phosphor material in finely divided form.

As shown schematically in FIGS. 1–3, a spray nozzle 61 is located at the spreading zone for the glass film. The vertical position of the spray nozzle may be varied, but preferably is located closer to the pot 20 than to the point of severance of the film from the wires. As previously stated, it has been applicant's observation that the formation of the film, by the illustrated apparatus, is such that the central portion thereof is formed first and the continuous movement of the wires in a divergent direction exhibits the phenomenon of supplying additional glass for the formation of the wider foil in the lower part of the spreading zone. The glass which forms the foil is being constantly supplied from the moving wires; the wires serving as reservoirs for the molten glass which is forming the film. Thus, in order to have a glass film with a uniformly applied phosphor material therein, it is advantageous to supply the phosphors in larger quantities to the area adjacent the wires rather than the central area as indicated on FIG. 4. In view of the fact that the glass is being continuously drawn by the wires, the vertical spread of the spray pattern developed by the nozzle 61, need not be particularly wide since all of the glass will pass the nozzle 61 during the formation thereof into the film.

After the glass film 49 has been separated or severed from the wire 29, it moves vertically downward into contact with the periphery of the drum 56 in a plane tangent to the surface of the drum. The drum 56 has a porous surface and is adapted to be rotated about a horizontal axis by a motor 57 connected thereto. A vacuum chamber 58, having a width equal to the width of the drum is positioned within the drum with its open face in close proximity to the porous surface of the drum 56 and encompassing approximately 90° of the circumference of the drum. A pipe 59, connected to a suitable source of vacuum, is connected to the interior of the chamber 58.

Thus it can be seen that as the film approaches the surface of the drum 56, it will be held against the drum surface by the vacuum chamber 58 and will be maintained against the drum surface through a 90° arc. When the film reaches the bottom of the drum 56, it will be released from the drum surface and will continue in a generally horizontal direction and be collected on a spool or roller 52, which may be driven in synchronism with and at substantially the same rate as the drum 56.

The motor 57 which drives the drum 56 is an electric motor connected to a suitable source of alternating current and having in series with this connection, a Variac motor speed control 60. The control 60 serves as a means for regulating the rotational velocity of the drum 56 and is calibrated in film thickness units. The motor 57 rotates the drum 56 at a velocity greater than the rate at which the film is being formed by the wire 29. In other words, the peripheral velocity of the drum 56 is always greater than the normal linear velocity of the formed film as it is severed from the wire 29. Thus it can be seen that the differential velocity of the moving film and the drum periphery will result in the application of longitudinal stress or tension to the film after it has been separated from the wire 29. By adjusting the rate of rotation of the drum, applicant is able to vary the thickness of the film after it has been severed from the wire 29. The film 49, after being severed from the wire, is still in a somewhat plastic state so that the application of tension in a direction parallel to its travel will stretch the film and result in the production of a film which is thinner than it would normally be without the application of this force.

Obviously the speed with which the motor 57 rotates the drum 56 will be determinative of the thickness of the ultimate glass film being produced and by this simple expedient regulate the thickness of the film.

This additional stretching of the film also aids in preventing the formation of waves in the film which will normally be present due to the stress embodied in the film during the stretching thereof in the lateral direction by the wire 29 as it passes through the spreading zone.

During the formation of the film 49 or "foil" as it is sometimes termed, it is necessary that the temperature of the film in the spreading zone be maintained at an elevated level so that the foil will not set up until it has spread to a considerable width. In fact, the system cannot operate in a trouble-free manner unless careful control of the temperature conditions of the atmosphere surrounding the film are maintained. If the viscosity of the film increases before severing to the extent that the tension in the wires is not capable of stretching the film, waves and irregularities in the dimensions of the film will occur and the wires will no longer perform their functions of drawing a uniform film.

With this in view, applicant provides a pair of flat, surface heaters 53 and 54 which extend vertically on either side of the spreading zone and thus provide a blanket of heat surrounding the film 49. These heaters may take any conventional form. For example, as shown in the drawings, these heaters are formed of ceramic material having electric resistance wires 55 in their surfaces and by connecting the wires to a suitable source of electric current, they will be heated.

It should be pointed out that while applicant has described the heating elements utilized in this device as being electrical, it would be feasible and sometimes advantageous to use radiant gas burners to provide heat for the melting chamber or for the blanket of heat surrounding the spreading zone.

In the operation of the device described, the motors 39 and 40 are energized and the wire 29 will be continuously drawn through the apparatus, thus continuously forming a film 49 of glass in the spreading zone. As the glass is drawn from the pot 20 by the movement of wire therethrough, it is replenished by the flow of molten glass from the melting chamber 17.

Any suitable spraying technique and apparatus can be employed for spraying the phosphor particles onto the glass film. The temperature of the glass is sufficient to enable it to flow in an even manner thus permitting it to be drawn and stretched into an extremely thin film. In addition, the viscosity of the glass enables it to flow around and at least partially encapsulate the phosphor particles which strike the glass film. In carrying out the invention, the thickness of the glass is of such a dimension that the heat is dissipated in the surface area struck by the phosphor particles and thereby avoiding excessive heat build-up of the phosphor particle itself. Thus, under the conditions described, no substantial damage is done to the phosphor particles when striking the extremely thin glass film.

Luminescent glass films produced according to the present invention can be employed for a variety of purposes including assorted display devices or display lamps that luminesce on proper excitation. In addition, the luminescent glass film can be incorporated into paint composition by breaking up the glass film. Highway center stripe paint can be made in this manner.

It is apparent from the foregoing that various types of base glass can be employed for the preparation of the glass film including soda-lime glass, lead glasses and the like. Representative glass compositions are listed below, all figures being percent by weight.

(A)

| | |
|---|---|
| $SiO_2$ | 34.82 |
| $K_2O$ | 6.11 |
| $PbO$ | 58.66 |
| $Sb_2O_3$ | 0.41 |

(B)

| | |
|---|---|
| $ZnO$ | 57.0 |
| $H_3BO_3$ | 42.7 |
| $MnO_2$ | 0.46 |

(C)

| | |
|---|---|
| $SiO_2$ | 47.6 |
| $Al_2O_3$ | 31.3 |
| $MgO$ | 11.1 |
| $ZnO_2$ | 7.0 |
| $TiO_2$ | 1.5 |
| $LiF$ | 1.0 |
| $NaSBO_3$ | 0.5 |

(D)

| | |
|---|---|
| $SiO_2$ | 67.7 |
| $Al_2O_3$ | 2.8 |
| $MgO$ | 4.0 |
| $K_2O$ | 0.7 |
| $Na_2O$ | 15.7 |
| $CaO$ | 5.6 |
| $BaO$ | 2.0 |
| $B_2O_3$ | 1.5 |

Any phosphors can be used for purposes of the present invention; the specific phosphor chosen is not critical. The phosphor particles can be sprayed in the form of a suspension in an organic vehicle which will immediately volatilize upon striking the hot glass surface of the film. Alternatively, the phosphors may be in an aqueous suspension or in finely divided form without a vehicle. The concentration of the phosphor material on the glass film can be varied as is desired. For practical purposes the amount used will be that to obtain an adequate uniform coating of the glass film. Generally, it is desirable to have a spray of uniform density so that the light emitted has a uniform character and will have a pleasing appearance. However, it is understood that the density or distribution of the phosphor material on the glass film can be varied so as to yield any particular pattern or decorative effect on the resulting glass film.

Velocity of the film can vary considerably depending on many factors. Films have been produced at the linear velocity of 28 to 32 feet per minute with a thickness range of 1.5 to 1 mil with satisfactory results.

Thus it can be seen that applicant has provided a method for obtaining a continuous foil, sheet or film of extremely thin glass of uniform cross-section that exhibits luminescence under proper excitation or activation radiation. By adjusting the rate at which the drum 56 is rotated, it is possible to adjust the thickness of the film as it is being drawn and thus films of varied thickness may be alternately drawn in a continuous manner by the apparatus described above. Adjustment of the foil thickness is also possible by regulating the temperature and thus the viscosity of the glass. However, it is more satisfactory to regulate the drawing rate and in this manner, films having thickness in the range of 0.3 to 5 mils having uniform thickness throughout their width have been formed.

Specific activation or excitation radiation will depend on the specific phosphor utilized as well be appreciated by those skilled in the art.

Examples of suitable phosphors that can be utilized according to the present invention are listed below, but it will be apparent that others may also be used:

Trivalent cerium activated $Si_3(PO_4)_2$, $KBaPO_4$, $NaBaPO_4$, $KCaPO_4$, and $Ca_3(PO_4)_2$; $NaCaPO_4$, $Ca_2ZnSi_2O_7$, $Ca_2MgSi_2O_7$, $LaSi_2O_7$, rare earth compounds; the sulfides, borates, selenides, tellurides of alkali metals, zinc and cadmium.

Having thus fully described the invention, what is claimed is:

1. A method for producing continuous glass films that will luminesce under proper excitation radiation which comprises forming an extremely thin film of glass and, while said film is being drawn and at a temperature above its softening point, spraying said film with phosphor particles so as to embed said particles in said glass film.

2. A method for producing continuous glass films exhibiting luminescence under proper excitation radiation which comprises continuously forming an extremely thin glass film from a reservoir of molten glass, and applying phosphor particles to said film while said glass film is at a temperature above its softening point and while it is being drawn to embed said phosphor particles in said glass and thereby at least partially encapsulate said phosphor particles to produce a luminescent film having good moisture resistance and a high light output efficiency.

3. A method for providing a glass matrix for phosphor particles without degrading the phosphor by exposure to excessive heat comprising forming an extremely thin glass film, spraying phosphor particles on said film while being drawn and at a temperature above the softening point of the glass and embedding said phosphor particles in said glass film.

4. A method for preparing continuous luminescent glass films which comprises forming a continuing glass film from a reservoir of molten glass, spraying said film with phosphor particles while the glass film is being drawn and is at a temperature above the softening temperature of the glass and permanently attaching and embedding the phosphor particles in the surface of the film, said film being of a thickness of about 0.3 mils to about 5 mils.

5. A method of forming a continuous glass film that will luminesce upon exposure to activation radiation comprising continuously moving a pair of glass-wettable members out from a reservoir of molten glass in diverging directions to form a film of glass between the divergent portions of said members, spraying the film with finely divided phosphor particles while said film is being drawn and formed and is at a temperature above the softening temperature of the glass so as to securely bond said phosphor particles to said film, and then separating the film from the members at a selected distance from said reservoir, depending upon the width of film desired.

6. A method of forming a continuous glass film that will luminesce upon exposure to activation radiation comprising continuously moving a pair of glass-wettable members out from a reservoir of molten glass in diverging directions to form a film of glass between the divergent portions of said members, spraying the film with finely divided phosphor particles so as to supply the phosphors in larger quantities to the film area adjacent the said members than at the central area of the film, said spraying being carried out while the film is being drawn and formed and is at a temperature above the softening temperature of the glass to securely bond said phosphor particles to said film and then separating the film from said members at a selected distance from said reservoir, depending upon the width of the film desired.

References Cited

UNITED STATES PATENTS

| 2,857,541 | 10/1958 | Etzel et al. | 252—301.6 |
| 2,881,566 | 4/1959 | Badger. | |
| 2,986,843 | 6/1961 | Loukomsky. | |
| 3,004,875 | 10/1961 | Lytle | 65—60 |
| 3,300,670 | 1/1967 | Veres. | |

S. LEON BASHORE, Primary Examiner

E. R. FREEDMAN, Assistant Examiner

U.S. Cl. X.R.

65—90; 117—33.5, 124; 252—301.6